United States Patent [19]

Hirai et al.

[11] Patent Number: 5,083,983
[45] Date of Patent: Jan. 28, 1992

[54] BELT TENSIONER

[75] Inventors: Hideo Hirai, Kakogawa; Yasuhiro Hashimoto, Miki; Norikazu Tanaka, Osaka, all of Japan

[73] Assignee: Mitsuboshi Belting Ltd., Japan

[21] Appl. No.: 601,313

[22] Filed: Oct. 19, 1990

[30] Foreign Application Priority Data

| Oct. 23, 1989 | [JP] | Japan | 1-276313 |
| Apr. 18, 1990 | [JP] | Japan | 2-103638 |
| May 10, 1990 | [JP] | Japan | 2-49699 |
| May 24, 1990 | [JP] | Japan | 2-134589 |
| Jun. 6, 1990 | [JP] | Japan | 2-60068 |

[51] Int. Cl.⁵ .............................................. F16H 7/08
[52] U.S. Cl. .................................................. 474/135
[58] Field of Search ................... 474/101, 109-111, 474/113-117, 133, 135

[56] References Cited

U.S. PATENT DOCUMENTS

| 4,725,260 | 2/1988 | Komorowski et al. | 474/135 |
| 4,826,471 | 5/1989 | Ushio | 474/135 |
| 4,983,145 | 1/1991 | Hirai et al. | 474/135 X |
| 5,011,460 | 4/1991 | Ouchi et al. | 474/135 X |

*Primary Examiner*—Thuy M. Bui
*Attorney, Agent, or Firm*—Wood, Phillips, Mason, Recktenwald & Van Santen

[57] ABSTRACT

An apparatus for tensioning a drive belt and having a tensioner arm with structure thereon for engaging a surface of the drive belt, structure for mounting the tensioner arm to a support for pivoting movement about a first axis in first and second opposite directions relative to the support including a roller bearing for guiding relative movement between the tensioner arm and support, and structure for normally biasing the belt in one of the first and second opposite directions relative to the support.

34 Claims, 4 Drawing Sheets

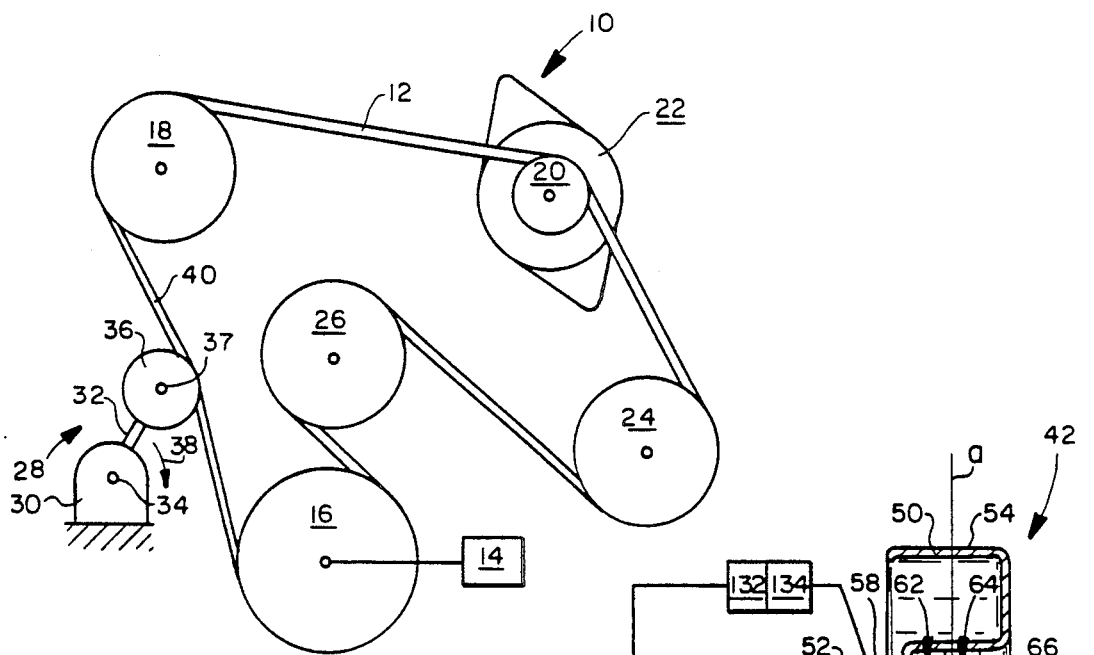
FIG. 1
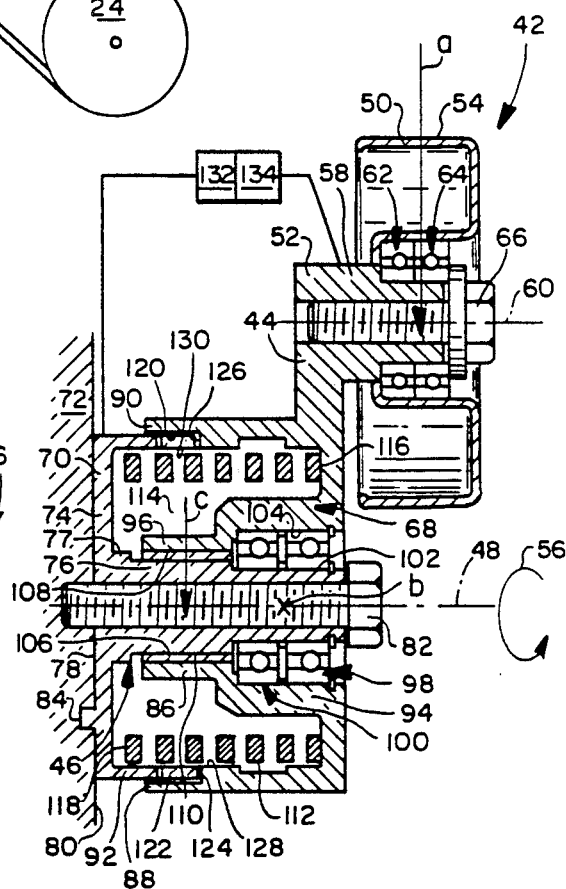
FIG. 2
FIG. 3
FIG. 2a

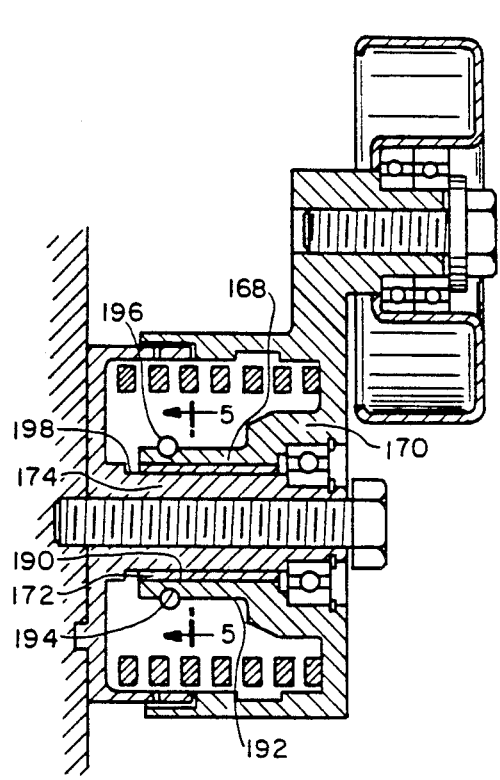
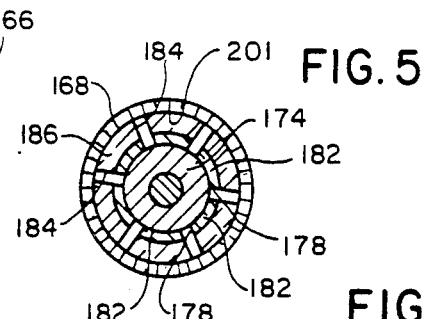
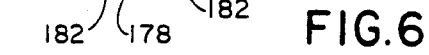
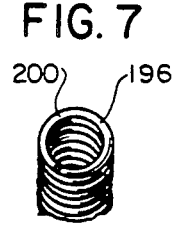
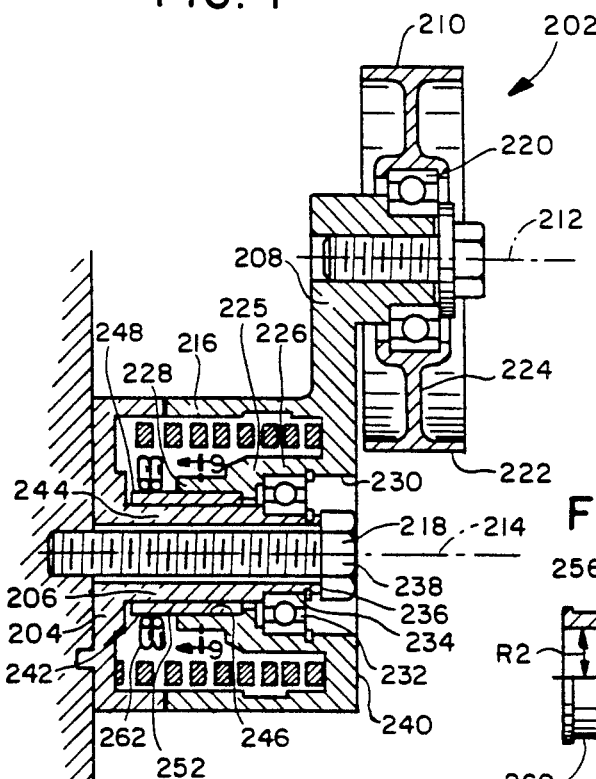
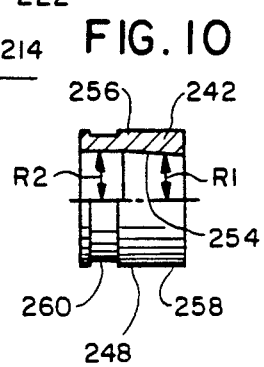

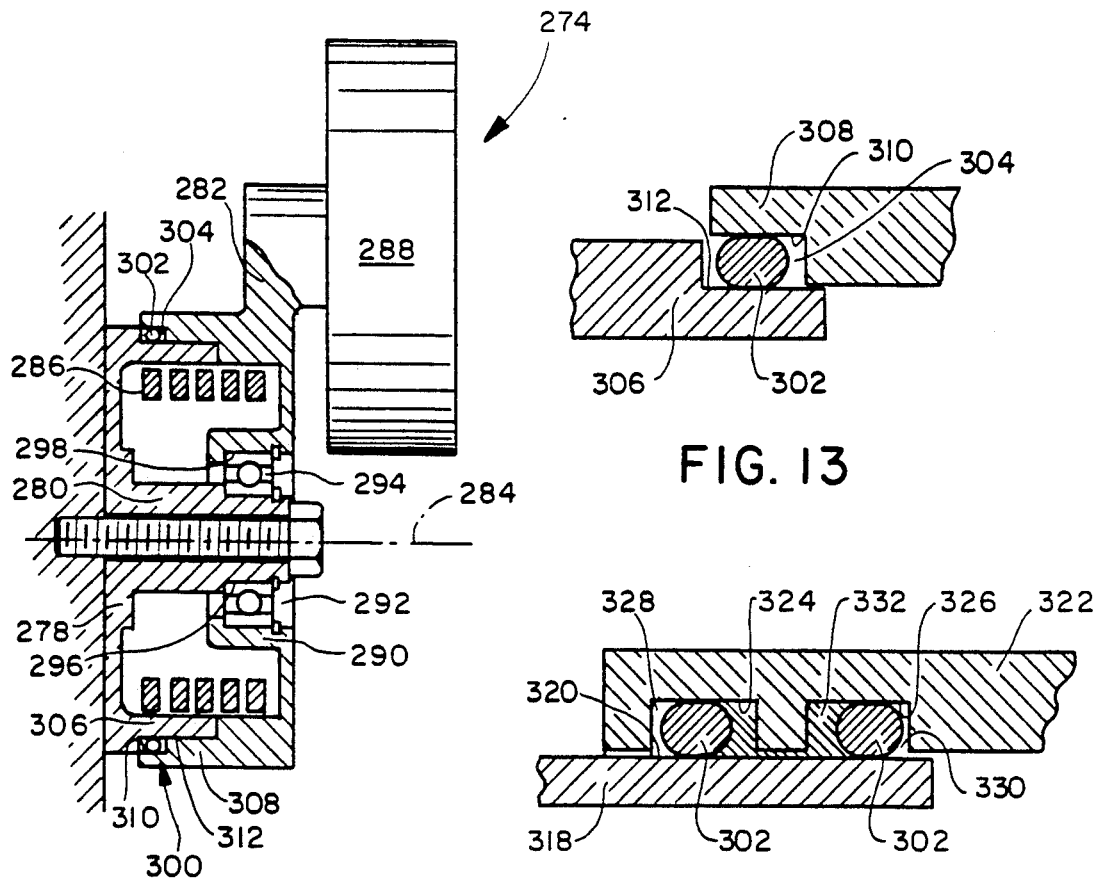
FIG. 12
FIG. 13
FIG. 14
FIG. 15
FIG. 16

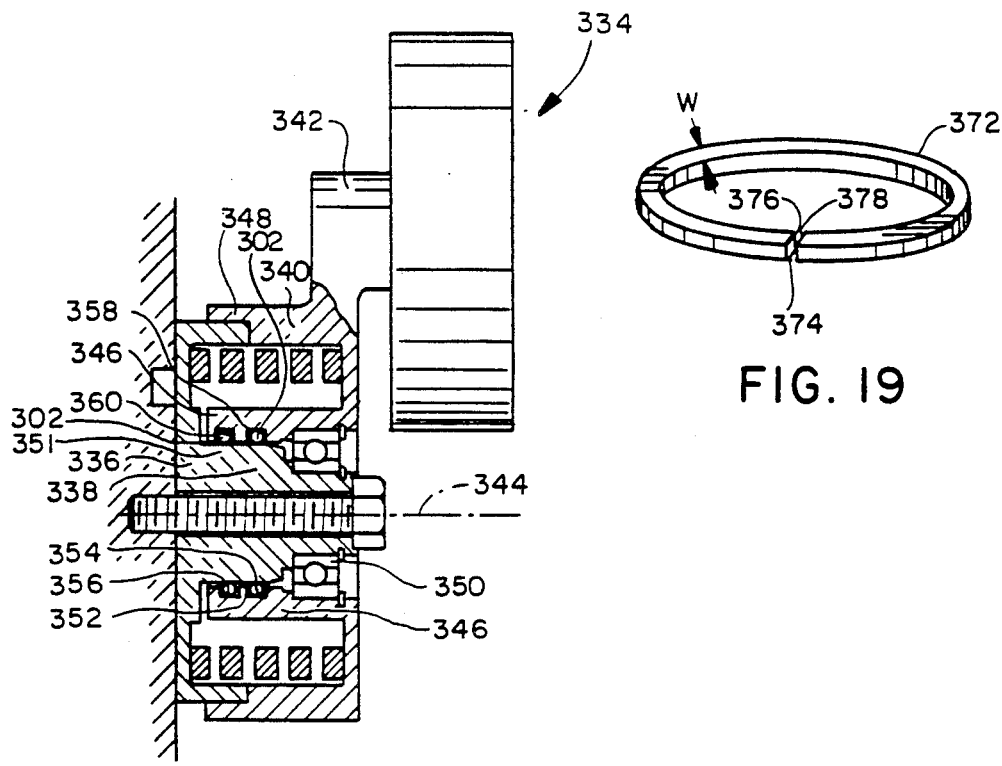
FIG. 17
FIG. 19
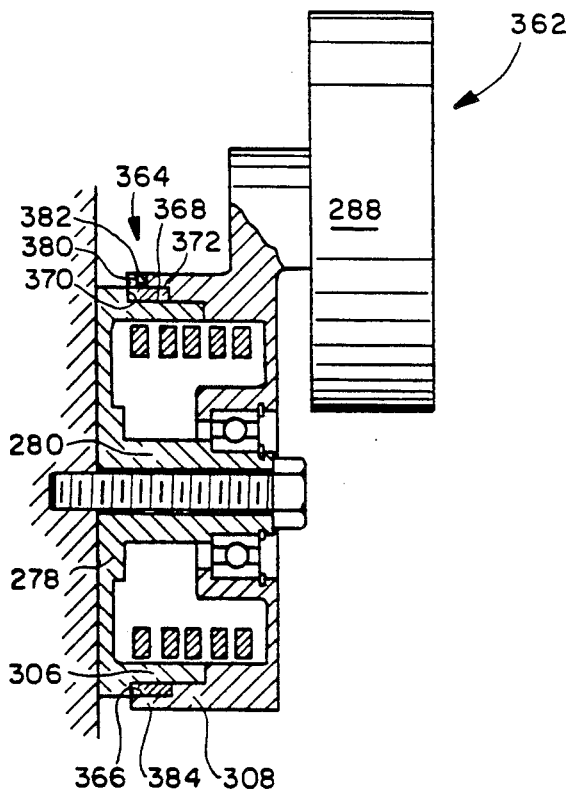
FIG. 18

BELT TENSIONER

BACKGROUND OF THE INVENTION

1. Field of the Invention

This invention relates to automatic drive belt tensioning apparatus and, more particularly, to an apparatus of the type having a pivotable tensioner arm with an idler pulley thereon that is normally urged against an unsupported portion of a drive belt to create a predetermined tension thereon and absorb system vibrations imparted through the belt.

2. Background Art

Power transmission systems employing drive and driven pulleys, with an endless transmission belt extended therearound, are used in many different environments. In a simple system having a single drive pulley and a single driven pulley, it is common to employ an automatic belt tensioner having an idler pulley that is biased against an unsupported portion of the belt between the pulleys to maintain a constant tension on the belt. Conventional systems may use torsion springs or compression springs to impart the requisite force to the idler pulley.

The advent of the serpentine belt system in automobiles introduced new considerations for designers of belt tensioners. In such systems, an endless belt is trained in a circuitous path about a plurality of accessories, such as pumps, alternators, etc. The belt frictionally drives a plurality of pulleys associated with shafts on the accessories. For the accessories to operate consistently and effectively, it is necessary for the frictional drive force developed on the accessory pulleys to be relatively constant i.e. for the tension on the belt to remain constant.

The length of the drive belt in serpentine belt systems aggravates the problem of maintaining a constant tension. The tension on the belt is affected by all of the individual components and any irregularity in the operation of any one of the components may induce vibrations on the belt which, if not suppressed, might affect operation of the other accessories. Consequently, for a belt tensioner to be efficient in such serpentine systems, it is necessary that a tensioner be capable not only of maintaining a constant belt tension, but also of absorbing detrimental vibrations transmitted through the belt.

One system designed to accomplish this end is shown in U.S. application Ser. No. 421,259, assigned to Mitsuboshi Belting Ltd. This system employs a damping element which is seperately spring biased against a part of a pivotable tensioner arm carrying an idler pulley. While this system has proven effective in damping system vibrations and maintaining a constant belt tension, it has some drawbacks.

First, separate spring elements are used to bias the tensioner arm in a tensioning direction and the damping element against the tensioner arm. The tensioning spring is a torsion spring, which also tends to absorb some system vibration and avoids kickback of the tensioner arm when there is a slackened condition of the belt. A separate compression type spring is used to bias a frictional damping element against a part of the tensioner arm.

There has been an increasing trend in the automobile industry towards maximizing passenger compartment space and minimizing the compartment space required for the engine. With the premium on space in the engine compartment, it is therefore important that all engine components, to include the belt tensioner, be made as small as possible, without compromising the operation thereof. The inherent drawback with the above system is that certain configurations for the system may become quite large to accommodate the separate springs and other necessary elements.

Another problem with the above belt tensioner is that certain embodiments thereof may have the friction member keyed to a supporting shaft for the belt tensioner so that the friction member is slidable axially relative to the rotational axis for the tensioner arm, yet fixed against rotation about that axis. The need to place splines or other similar guide structure on the friction element, and that element against which it slides, complicates manufacture and may appreciably add to the cost of construction.

While the use of a deformable slide bearing between the tensioner arm and a support therefor to some extent damps undesirable vibrations, this slide bearing alone may not give sufficient stability to the mount of the tensioner arm which may result in an undesirable skewing of the tensioner arm relative to the support. The result is generally that the tensioner arm will not smoothly rotate on the support, which may affect operation of the system components.

Further, to limit binding between the tensioner arm and support a gap may be left between the bearing and one of the tensioner arm and support therefor. The gap also allows undesired canting of the tensioner arm relative to the support.

SUMMARY OF THE INVENTION

The present invention is specifically directed to overcoming the above enumerated problems in a novel and simple manner.

The present invention is an apparatus for tensioning a drive belt and having a tensioner arm with structure thereon for engaging a surface of the drive belt, structure for mounting the tensioner arm to a support for pivoting movement about a first axis in first and second opposite directions relative to the support including a roller bearing for guiding relative movement between the tensioner arm and support, and structure for normally biasing the belt in one of the first and second opposite directions relative to the support.

The roller bearing provides a stable support for the tensioner arm and facilitates substantially uninhibited pivoting of the tensioner arm relative to its support.

The invention also contemplates a support to which the tensioner arm is mounted for pivoting movement.

Another object of the invention is to provide frictional force developing structure to damp system vibrations transmitted through the drive belt. An exemplary environment in which the invention has utility is in association with an automobile engine wherein vibration is generated in response to change in speed of, or loading on, the engine. The energy from the vibrations is converted into thermal energy through the frictional force developing structure.

The frictional force developing structure is preferably separate from the roller bearing. In a preferred form, the roller bearing defines, in effect, a fulcrum about which a modicum of tensioner arm pivoting is possible. The tensioner arm preferably has an idler pulley to engage the belt, which idler pulley traces a path that is axially spaced from one end of the roller bearing. At least a portion of the frictional force developing structure extends beyond the other axial end of the roller bearing. Vibrations imparted through the belt to the idler pulley pivot the tensioner arm on the roller bearing to develop a vibration damping frictional force on the other side of the roller bearing.

The invention contemplates numerous different structures to provide the frictional damping force. In one form of the invention, the tensioner arm and support therefor have radially facing surfaces between which a frictional force developing member is placed. The frictional force developing member can take any of a variety of shapes. It can consist of a plurality of elements fixed to one and/or the other of the support and tensioner arm. Alternatively, and in a preferred form, the frictional force developing member is in the form of an annular member, i.e. a ring or cylinder.

The invention also contemplates controllable variation of the frictional damping force from the frictional force developing structure. In one form of the invention, the frictional force developing member has at least a portion which extends axially beyond the other end of the roller bearing. A portion of the friction member is normally biased radially against the surface relative to which it moves.

In one form, the friction member is a cylinder with an axial slit along the entire length thereof. The biasing structure surrounds the sleeve to draw the axial edges thereof, bounding the slit, towards each other to thereby cause the sleeve to more firmly embrace the element which it surrounds.

Alternatively, circumferentially spaced, axial slits can be provided on the sleeve to define a deflectable tab. Structure is provided to bias the tab in a radial direction.

In one form, the tensioner arm has a base with axial slits defining a deflectable tab that is in radial coincidence with the deflectable tab on the friction sleeve. A biasing structure urges the tabs on the base and friction member simultaneously in a radial direction to enhance the frictional force and resultingly the damping capability for the system.

In one form, the friction sleeve has a non-uniform wall thickness with a reduced thickness at an axial end thereof that can be radially biased to enhance the friction force.

Various biasing structures are contemplated by the invention. The biasing structure can take the shape of a coil spring, a rubber ring, or the like. The invention also contemplates the provision of a set screw that is threadably engaged with one of the tensioner arm and support to be extendable selectively against and away from the friction member to control the friction force.

The invention contemplates many different system variables to control frictional force development and, consequently, the damping characteristics of the tensioning apparatus. For example, the relative axial positions of a) the "fulcrum", b) the idler pulley and c) the friction member can be adjusted. The further the idler pulley is away from the fulcrum point, the greater is the idler pulley moment arm and vibrational torque exerted on the tensioner arm. The axial position of the friction member relative to the fulcrum also determines the extent of the friction force.

The damping capabilities of the system are also dictated by the coefficient of friction of the material making up the friction ring. A balance is struck between material with a high coefficient of friction, which effectively reduces large vibrational forces, and material with a low coefficient of friction that facilitates smooth rotation of the tensioner arm relative to a support therefor.

Another variable in the inventive system is the radial position of the friction member. The positioning of the friction member radially outside of the pivot axis by a significant amount will cause the frictional surface area to be increased as well as the frictional moment arm.

Another variable in the system is the number of roller bearings that support the tensioner arm on the support. A plurality of roller bearings provide a more stable support than a single bearing and consequently limit canting of the tensioner arm relative to the support therefor, thereby minimizing the frictional force that is developed by the friction member to damp vibration.

The roller bearing which guides relative movement between the tensioner arm and support also develops a frictional force that damps vibrations.

It is not necessary that a roller bearing be employed to provide the fulcrum. Other configurations are contemplated by the invention.

The invention also contemplates a system wherein there is no separate friction member between the tensioner arm and support therefor. This simplifies the overall construction.

The invention further contemplates a compact structure that can produce a large frictional damping force. In one form, a cup-shaped base is defined on the tensioner arm base for cooperation with an oppositely opening cup-shaped support. Each of the support and tensioner arm base has an annular flange. The flanges are placed in axially overlapping relationship and cooperatively define a substantially enclosed pocket/receptacle for a friction ring.

This pocket/receptacle can be formed by undercutting only one of the flanges or, alternatively, the flange can both be undercut to define a stepped flange configuration whereby the flanges cooperatively define the pocket/receptacle.

The friction ring can be placed in the pocket/receptacle without securing the ring to either flange. This structure is desirable in that generally the flanges and ring have different coefficients of friction. In a high temperature environment, such as in an engine compartment, the ring might crack were it connected to a member having a different coefficient of friction.

This arrangement is also preferred in that it facilitates assembly of the ring into the system. Preferably, the friction ring is made of a resilient material that can be easily disposed around an underlying element to grasp the underlying element and thereby maintain its operative position. At the same time, there is no need to form integral axial guiding structures, such as splines, or the like, as earlier described in connection with prior art systems.

With the pocket/receptacles, it is also contemplated that a grease or other highly viscous material be placed therein to prevent the entry of foreign matter, rain, etc. into the pocket/receptacle as might inhibit rotation of the tensioner arm and/or alter the frictional damping force that is developed.

With the ring placed at a location radially outwardly a significant distance from the pivot axis for the tensioner arm, a relatively large friction developing surface area is defined which allows a large frictional damping force to be developed without the need for a material with a high coefficient of friction. Consequently, the advantages of significant damping and substantially unhindered pivoting of the tensioner arm are possible.

The ring itself need not be of large dimension. Consequently, the structure can be made very compact, smooth acting and highly effective in its damping capability.

The invention also contemplates a mounting element, such as a bolt, which simultaneously supports the tensioner arm on a support and the support on a mounting surface for the entire tensioning apparatus. In a preferred form, the bolt is axially recessed so as not to reside in the path traced by the idler pulley so that, in the event of a slackened belt condition, the belt cannot contact the head of the mounting bolt.

BRIEF DESCRIPTION OF THE DRAWINGS

FIG. 1 is a schematic representation of a serpentine belt system in an automobile, with the belt tensioning apparatus according to the present invention incorporated therein;

FIG. 2 is a side elevation view in section of a belt tensioning apparatus according to the present invention;

FIG. 2a is a schematic representation of the forces acting on the belt tensioning apparatus of FIG. 2;

FIG. 3 is a side elevation view in section of a modified form of belt tensioning apparatus according to the present invention;

FIG. 4 is a side elevation view in section of a further modified form of belt tensioning apparatus according to the present invention;

FIG. 5 is a cross-sectional view of the connection between a tensioner arm and support relative to which the tensioner arm is mounted, taken along line 5—5 of FIG. 4;

FIG. 6 is a perspective view of a friction generating member acting between the tensioner arm and support in FIG. 4;

FIG. 7 is an enlarged, fragmentary perspective view of a coil spring used to bias a part of the tensioner arm against a friction member and the support for the tensioner arm;

FIG. 8 is a side elevation view in section of a modified belt tensioning apparatus according to the present invention;

FIG. 9 is a cross-sectional view of the connection between a tensioner arm and support therefor in the belt tensioning apparatus of FIG. 8, taken along line 9—9 of FIG. 8;

FIG. 10 is a fragmentary, partial section view of a friction member disposed between the tensioner arm and support in the belt tensioning apparatus of FIG. 8;

FIG. 11 is an end elevation view of the friction member in FIG. 10;

FIG. 12 is a side elevation view in section of a modified belt tensioning apparatus according to the present invention;

FIG. 13 is an enlarged, fragmentary, cross sectional view of a friction ring located between cooperating flanges on a tensioner arm and support therefor in the FIG. 12 system;

FIG. 14 is a view as in FIG. 13 with modified flanges to accept a pair of axially spaced friction rings;

FIG. 15 is a side elevation view of the friction ring as shown in FIGS. 12-14;

FIG. 16 is a cross-sectional view of the friction ring taken along line 16—16 of FIG. 15;

FIG. 17 is a side elevation view in section of a still further modified form of belt tensioning apparatus according to the present invention;

FIG. 18 is a side elevation view in section of a still further modified form of belt tensioning apparatus according to the present invention; and FIG. 19 is a perspective view of a friction ring used in the system of FIG. 18.

DETAILED DESCRIPTION OF THE DRAWINGS

An exemplary system into which an automatic belt tensioner, according to the present invention, can be incorporated, is shown in FIG. 1 at 10. The system 10 is what is generally characterized as a serpentine belt system wherein a single, endless, belt 12 drives, in this particular system, four separate automobile accessories. An engine 14 operates, through a drive shaft (not shown), a driving pulley 16 which, through belt 12, drives a pulley 18 which is operatively connected to an air pump (not shown), a pulley 20 on the operating shaft of an alternator 22, a pulley 24 on a shaft which operates a power steering unit (not shown), and a pulley 26 operatively connected to the shaft of a water pump (not shown) for the engine 14.

The inventive belt tensioner, shown schematically in FIG. 1 at 28, has a fixed support 30, to which a tensioner arm 32 is attached for pivoting movement in first and second opposite directions, about a pivot axis 34. The tensioner arm 32 carrier at its end an idler pulley 36, that is rotatable about an axis 37, which is parallel to and spaced from the tensioner arm pivot axis 34. The tensioner arm 32 is resiliently biased in rotation in the direction of arrow 38 to bear the idler pulley 36 against an unsupported belt portion 40 between the driving pulley 16 and driven pulley 18, with a force calculated to cause a constant predetermined tension to be applied to the belt 12.

At startup of the engine 14 and the driving pulley 16, there is a tendency of the belt portion 40 to thrust the idler pulley 36 so as to pivot the tensioner arm 32 oppositely to the direction of arrow 38. Vibration from any of the components 16, 18, 22, 24, 26, at startup, and during a load change, are transmitted through the belt 12 to the belt tensioner 28.

A preferred form of belt tensioning apparatus, according to the present invention, is shown at 42 in FIG. 2. The belt tensioning apparatus 42 has a tensioner arm 44, which is rotatable relative to a fixed support 46 selectively in first and second opposite directions about a pivot axis 48. The tensioner arm 44 has an idler pulley 50 on its one end 52, remote from the pivot axis 48. The idler pulley 50 has peripheral, annular surface 54 which, in operation, is normally biased against a drive belt (not shown) in the direction of arrow 56.

The idler pulley 50 is rotatably mounted to a stem 58 on the tensioner arm end 52 for rotation about an axis 60, which is parallel to and spaced from the pivot axis 48. A pair of axially spaced roller bearings 62, 64 surround the tensioner arm stem 58 and guide free rotation of the idler pulley 50 thereabout. A bolt 66 removably secures the idler pulley 50 on the tensioner arm stem 58.

The tensioner arm 44 has a base 68 which is mounted to a support plate 70 that is fixedly secured on a suitable mounting base 72 for the tensioner arm 44, which base 72 may be, for example, an engine block or an associated bracket. Support plate 70 has a cup-shaped body 74, opening to the right in FIG. 2, and a cylindrical three-step shaft 76 projecting in cantilever fashion from the center of the body 74 to define the pivot axis 48 for the tensioner arm 44. The shaft 76 has a thickened root portion 77 where the shaft 76 joins the base 68. The body 74 has a flat surface 78 for facially engaging a flat surface 80 on the mounting base 72. A bolt 82 is threaded through the center of the shaft 76 and into the base 72 to hold the tensioner arm 44 on the base 68 and the support plate 70 firmly against the base 72. A locating pin 84 on the plate 70 extends into the base 72 to prevent rotation of the support plate 70 relative to the base 72 about the pivot axis 48.

The tensioner arm base 68 consists of first and second coaxial, annular parts 86, 88 centered on the pivot axis 48. The first, inner base part 86 surrounds the support plate shaft 76 and is guided thereby in rotation. The second, outer base part 88 has a free annular flange 90 which surrounds a flange 92 on the support plate 70.

The first, inner base part 86 has a stepped configuration with large and small diameter portions 94, 96, respectively. Axially spaced roller bearings 98, 100 are mounted around an undercut portion 102 of the shaft 76 and engage the radially inwardly facing surface 104 of the large diameter portion 94 of the first, inner base part 86. The roller bearings 98, 100 provide a firm foundation for the tensioner arm 44 to facilitate smooth rotation thereof relative to the support 46 and also define a fulcrum for the tensioner arm 44, as described below.

Due to the axially spaced relationship of the idler pulley 50 and the roller bearings 98, 100, vibrations imparted to the idler pulley 50 through the operating belt exert a torque on the base 68 that tends to cant the base 68 about the bearings 98, 100 and thereby misalign the axis of the base 68 relative to the axis 48. To absorb these detrimental vibrations, a frictional force developing ring/sleeve 106 is provided between the small diameter portion 96 of the first annular base part 86 and the shaft 76 at a location spaced axially from the roller bearings 98, 100. The forces acting on the system are shown schematically in FIG. 2a with point "b" acting as a fulcrum. The vibrational force is indicated by arrow "a" and is countered by the force "c" from the ring/sleeve 106.

The friction ring 106 is fit between a radially inwardly facing surface 108 on the small diameter portion of the first arm part 86 and a radially outwardly facing surface 110 on the 76. The ring 106 preferably is closely fit between the surfaces 108, 110 and is operable also in both a slightly radially compressed state and with a slight radial space maintained between the ring 106 and one of the surfaces 108, 110. The friction ring 106 is preferably made from a molded nylon material and is fixed to either one of the base 68 and tensioner arm 44.

While a ring-shaped/cylinder-shaped configuration for the element 106 is shown in FIG. 2, the invention contemplates other configurations that may or may not be continuous i.e. annular. For example, pads of friction material could be fixedly mounted to one and/or the other of the shaft 76 and base 68. In a preferred form, the friction ring 106 has a significant axial dimension and engages the surface 108, 110 over substantially the entire axial extent of the ring 106 to produce a sufficient friction force to itself effectively damp vibrations.

The configuration and size of the surface through which friction is developed through ring 106 determines the magnitude of the frictional force that is developed and the capability of the ring 106 to absorb vibrations. The type of material that makes up the ring 106 also dictates the amount of frictional damping. Consequently, the material is selected for the particular environment in which the tensioning apparatus 28 is used.

The damping capabilities of a material depends on its coefficient of friction. Rubber and asbestos have high coefficients of friction to effectively damp large vibrational forces. Copper alloy, oil impregnated sintered metal and aluminum have medium coefficients of friction. Teflon ® and nylon have low coefficients of friction. The above materials are exemplary of those suitable for use with the inventive tensioning apparatus and exhibiting different vibration dampening characteristics. Other compositions are also contemplated by the invention. The particular belt environment dictates the appropriate material.

The invention also contemplates direct contact between the tensioner arm 44 and base 68 to develop a vibration reducing/damping friction force. To avoid binding upon the tensioner arm 44 tilting, a slightly loose fit between the tensioner arm 44 and base 68 is preferred.

Vibrations induced by the belt to the belt tensioning apparatus 42 are also absorbed, to a certain extent, by a torsion spring 112, which resides in annular space 114 defined cooperatively by the first and second annular base parts 86, 88 and the body 74 of the support plate 70. One end 116 of the spring 112 is fixed to the tensioner arm 44, with the opposite spring end 118 fixed against rotation to follow the support plate 70, to thereby allow loading of the tensioner arm 44 to produce the desired torsional force. The connection of the torsion spring 112 can be accomplished by conventional means known to those skilled in the art. The spring 112 preferably has a square cross-sectional configuration to maximize spring force and minimize the size of the spring 112. However, other cross sections, such as circular, are suitable. The spring 112 is preloaded with a force of several kilograms. The flange 90 of the annular base part 88 has an annular undercut 120 with a radial dimension sufficient to accommodate the free, annular end 122 of the flange 92 on the support plate 70. This places axially facing shoulders 124, 126 on the support plate 70 and tensioner arm 44, respectively, in confronting relationship. This arrangement limits the relative axial movement of the support plate 70 and tensioner arm 44 towards each other. The radially inwardly facing surfaces 128, 130 on the support plate 70 and tensioner arm 44, respectively, bound a part of the annular space 114 for the spring 112 and are preferably equal in diameter to combine to provide a smooth surface for the spring 112.

Cooperating means, shown schematically at 132, 134, in association with the support plate 70 and tensioner arm 44, respectively, are provided to limit the range of pivoting of the tensioner arm 44 relative to the support plate 70. Structure to accomplish this is well known to those skilled in the art.

The number of roller bearings employed in the design is dictated by the load on the apparatus 42 as well as by the desired frictional force to absorb anticipated vibration. The two roller bearings 98, 100 in FIG. 2 provide a stable mount of the tensioner arm. That is, the roller bearings 98, 100 resist the canting of the tensioner arm base 68 which limits the pressure of the friction ring 106 against the one of the small diameter base portion 96 and the shaft 76 relative to which it rotates. By using a single roller bearing, the base 68 more readily tips on the shaft 76 to increase the friction force generated between the base 68 and the shaft 76 upon the tensioner arm 44 tilting.

This latter construction is shown in FIG. 3 on a belt tensioning apparatus at 136 that is very similar to that 42 shown in FIG. 2. That is, the tensioning apparatus 136 has a tensioner arm 138 pivotably connected to a shaft 140 on a support plate 142, as in the prior embodiment. There are two significant differences between the FIG. 3 embodiment and that in FIG. 2. First, a single roller bearing 144 is employed. Second, the frictional force developing member 146 is axially longer than its counterpart 106 in the FIG. 2 embodiment. The result is that the tensioner arm 138 in the FIG. 3 embodiment has less resistance to tilting relative to the base 150 with the result being that there is a greater frictional force developed between the base 150 on the tensioner arm 138 and the shaft 140 during operation. With the increased frictional force comes an increased suppression of vibrations induced from the belt to the apparatus 136.

The tensioner arm base part 152 corresponding to the base part 86 in FIG. 2 has a stepped configuration with large and small diameter portions 154, 156 respectively. The thickened, large diameter base portion 154 is axially shorter than its counterpart 94 in the FIG. 2 embodiment in that an undercut 158 defined therein need accommodate only a single roller bearing 144.

The small diameter base portion 156 is extended in an axial direction over its counterpart 96 in the FIG. 2 embodiment. The middle step portion 160 of the shaft 140 is extended in an axial direction to define an annular surface 162 approximately equal in axial length to a facing surface 164 on the small diameter base portion 156 to cooperate with the frictional force developing member 146. A larger friction generating contact area than that in the prior embodiment is established between the friction member 146 and the one of surfaces 162, 164 relative to which it rotates.

While the tensioner arm 138 in FIG. 3 readily tilts relative to the axis 148, the FIG. 3 arrangement is preferred over that in FIG. 2 when it is necessary to generate a large frictional force i.e. to damp large vibrational forces. With the system in FIG. 3, the tilting force on the tensioner arm 138 induced by system vibration is absorbed primarily by the friction member 146, rather than by the roller bearing 144.

In FIGS. 4-7, a modified form of belt tensioning apparatus is shown. The belt tensioning apparatus, shown at 166 in FIG. 4, is substantially the same as that 136 shown in FIG. 3. The only differences lie in a) the configuration of the reduced diameter portion 168 of a tensioner arm base 170, corresponding to that 150 in the FIG. 2 embodiment and b) the configuration of the frictional force developing member 172.

The base 170 surrounds the friction member 172, which int urn surrounds a shaft 174 that is identical to the shaft 140 shown in the FIG. 3 embodiment. The friction member 172, which is preferably formed from nylon, has a cylindrical body 176 with a plurality of parallel, axially extending slits 178, which are equidistantly spaced about the periphery of the body 176. The slits 178 extend a distance on the order of one half the axial length of the body 176 so that a portion 180 of the body 176 is uninterrupted. The number of slits 178 is a design consideration, however, six such slits are shown in a preferred form. Adjacent slits 178 define tabs 182 that are radially deflectable relative to the remainder of the body 176.

The small diameter portion 168 of the stepped base 170 has an equal number of slits 184 cut therethrough to coincide with the slits 178 on the friction member 172. Adjacent slits 184 on the base 170 define tabs 186 which are radially deflectable together with the tabs 182 on the friction member 172. Preferably, the base 170 is made from aluminum to give the necessary flexibility to the tabs 186. The outer surface 188 of the friction member 172 is fixed to the radially inwardly facing surface 190 of the small diameter portion 168 of the base 170 to maintain the alignment of the slits 178, 184 on the friction member 172 and the base portion 168.

The outer surface 192 of the base portion 168 has an annular undercut 194 therein to seat a coil spring 196 that exerts a radial bias on the tabs 186 which are thereby bent radially inwardly against the tabs 182, which in turn bear against the outer surface 198 of the shaft 174. The spring 196 consists of a length of tightly wound coils 200, with the free ends of the spring being joined to define an annular configuration with an inside edge 201 having an effective diameter less than the diameter of the undercut 194. The spring 196 must be radially enlarged to be placed in the undercut 194 and, once in the undercut 194, exerts a constant pressure on the tabs 182, 186 to develop a significant frictional force to damp system vibrations.

The biasing structure may take a form other than that of a formed coil spring, as shown in FIGS. 4, 5 and 7. For example, the biasing structure could be a rubber ring, a metal ring, or the like. The biasing/frictional force enhancing structure is preferred in an environment with large vibrational forces as for example, with a diesel engine.

A modified form of the invention is shown in FIGS. 8-11. The belt tensioning system, shown at 202 in FIG. 8, consists of a support plate 204 with an integral shaft 206 and a tensioner arm 208 pivotably attached to the shaft 206 and carrying an idler pulley 210. The pulley 210 rotates about an axis 212, that is parallel to and spaced from the axis 214 of rotation of the tensioner arm base 216, as defined by a mounting bolt 218. The idler pulley 210 has a somewhat different configuration than those shown in earlier described embodiments. A single roller bearing 220 is employed to support the pulley 210. The belt engaging surface 222 on the pulley 210 is supported and reinforced by a single, annular web 224 disposed axially in the center of the surface 222. The particular configuration of the idler pulley 210, however, is primarily a design consideration.

The base 216 of the tensioner arm 208 has an inner base part 225 with a large diameter portion 226 and a small diameter portion 228. An undercut 230 is provided in the large diameter portion 226 and defines a surface for engaging a roller bearing 232 surrounding a reduced diameter portion 234 of the three-step shaft 206. The large diameter portion 226 of the base 216 and shaft 206 are configured so that the free end 236 of the shaft 206 is axially inset so that the head 238 of the securing bolt 218 for the tensioner arm 208, which bears thereagainst, does not project axially beyond the planar outer surface 240 of the tensioner arm 208. With this arrangement, the belt (not shown) in the line of idler pulley 210 cannot engage the bolt head 238, even if the belt becomes significantly slackened.

A frictional force developing ring/sleeve 242, which is preferably made of nylon, surrounds the middle step portion 244 of the shaft 206 and is attached fixedly to an undercut surface 246 on the small diameter portion 228 of the base 216. A portion 248 of the friction sleeve/ring 242 projects axially beyond the small diameter portion 228 of the base 216.

The friction sleeve/ring 242 has a generally cylindrical configuration and slit 250 therein extending over the entire axial length of the body 252 of the sleeve/ring 242. The exposed portion 248 of the sleeve/ring 242 is slightly flared i.e. the radius of the inside surface 254 at R1 is slightly less than the axially spaced radius R2, so that the wall 256 on the projecting portion 248 of the sleeve/ring 242 becomes progressively thinner from right to left in FIG. 10. The middle step 244 of the shaft 206 preferably has a taper to match the tapered inside sleeve/ring surface 254. This tapered arrangement facilitates assembly.

The outer surface 258 of the sleeve/ring 242 has an annular undercut 260 for reception of a metal biasing spring 262. The spring 262 consists of a formed wire with a plurality of turns and offset opposite ends 264, 266, which, with the spring 262 in operative position, are preferably arranged to cooperatively define an acute angle α therebetween. By urging the ends 264, 266 towards each other, the effective diameter of the spring coils 268 is increased to facilitate location of the spring 262 in the vicinity of the undercut 260. By releasing the spring ends 264, 266, the coils 268 constrict and exert a radial force on the sleeve/ring 242 to draw the free edges 270, 272 on the sleeve/ring 242, which are normally spaced from each other, into closer proximity, which results in the inside surface 254 of the sleeve/ring 242 more tightly embracing the shaft 206.

The one drawback that the systems shown in FIGS. 2–11 have is that the friction generating means therein, which absorb the system vibrations, are spaced a very short distance from the pivot axes for the tensioner arms. It is consequently difficult to develop a very large friction force. This problem is overcome by the embodiments described below.

In FIGS. 12–16, one alternative system is shown in which a larger friction force can be developed in a very compact structure. The modified system, identified at 274 in FIG. 12, has a support plate 278, made preferably from die cast aluminum, with an integral shaft 280. The shaft 280 supports a tensioner arm 282, also preferably made of die cast aluminum, for rotation about the central axis 284 of the shaft 280. A torsion coil spring 286 biases an idler pulley 288 against a belt (not shown) to effect tensioning of the belt. The tensioner arm 282 has a base portion 290 which surrounds the shaft 280 and defines, in conjunction therewith, a receptacle 292 for a roller bearing 294, which acts between an undercut surface 296 on the shaft 280 and a radially inwardly facing surface 298 on the base 290.

Frictional force developing structure is provided at 300 to damp vibrations and restrain pivoting of the tensioner arm 282 relative to the shaft 280. The friction generating structure 300 consists of a ring 302 which is seated in a pocket/receptacle 304 defined cooperatively by an annular, stepped flange 306 on the support plate 278 and a surrounding, stepped flange 308, which is concentric with and radially outside of the base portion 290.

The ring 302 preferably has a resiliency and hardness of 65–95 according to the JIS standard. With a hardness less than 65, the ring 302 itself vibrates. Further, permanent distortion of the ring 302 might occur during operation which results in an uneven generation of frictional force. With a hardness greater than 95, the coefficient of friction is reduced to generate only a relatively small friction force.

The use of a resilient material for the ring 302 is preferred so that it expands and contracts with the flanges 306, 308 in a high temperature environment. The tensioning structure 274 is normally employed on an automobile engine compartment in which there are dramatic temperature changes. With a resilient ring 302, a positive and consistent fit results between the flanges 306, 308. A rigid material does not respond effectively to these temperature changes and may inconsistently coact with the flanges at different temperatures.

Preferred materials for the ring 302 include, nitrile rubber, acrylic rubber, fluoro rubber, silicone rubber, and urethane rubber. Silicone rubber is preferred for its durability at both high and low temperatures.

The flange 308 has an undercut 310 which axially coincides with a radially outwardly facing undercut surface 312 on the flange 306 to cooperatively produce the annular pocket/receptacle 304 which, in cross section, has a rectangular shape.

The ring 302 is preferably circular in cross section and has an inside surface 316 with a diameter slightly less than that of the undercut surface 312 and an outer surface 317 that is slightly greater than the diameter of the surface 310 on the flange 308. Other ring shapes are contemplated, including rectangular and triangular configurations. A circular shape is preferred because there is no edge on which a force can be concentrated. At the same time, this shape gives good durability and a constant friction force, even when distorted.

With the ring 302 in its operative position, shown in FIGS. 12 and 13, the ring 302 is radially compressed to an elliptical shape. The axial dimension of the pocket 304 is greater than the major axis of the ellipse, defined by the compress ring 302, and thus allows the ring 302 to float axially within the confines of the pocket 304.

Because the friction ring 302 is a considerable distance from the tensioner arm axis 284, a substantial friction generating surface is formed which developes a frictional force with a large moment arm.

A modification to the structure in FIGS. 12 and 13 is shown in FIG. 14. The flange 318, corresponding to the flange 306 on the support plate 278 in the prior embodiment, has a constant diameter outer surface 320, which is surrounded by a flange 322, corresponding to the flange 308 on the base 276 of the tensioner arm 282. The flange 322 has two axially spaced, annular, squared undercuts 324, 326 defining pockets/receptacles 328, 330, respectively, for accepting the rings 302. The rings 302 cooperate with the pockets 328, 330 in the same manner as the ring 302 cooperates with the pocket 304 in the embodiment in FIGS. 12 and 13.

A supply of grease 332, or other highly viscous material, is preferably placed in the pockets 328, 330 to prevent the admission of dust, dirt, rain, and other foreign matter into the pockets 328, 330, as might inhibit free sliding movement of the rings 302 and free rotation of the tensioner arm. If grease is employed, nitrile rubber is a preferred material for the ring 302.

A modified form of belt tensioning apparatus, according to the present invention, is shown at 334 in FIG. 17. The apparatus 334 consists of a cup-shaped support plate 336 with an integral shaft 338 supporting the cup-shaped base 340 of a tensioner arm 342 for rotation about an axis 344. The base 340 has inner and outer concentric, cylindrical portions 346, 348, respectively, with the former surrounding the shaft 338 and being guided in rotation relative to the shaft 338 by a roller bearing 350.

The middle portion 351 of the three-step shaft 338 is significantly enlarged in a radial direction over corresponding portions of the shafts in the prior embodiments. This creates a friction generating shaft surface 352 that is significantly radially larger than those in the prior embodiments.

The inner base portion 346 surrounds the surface 352 and has axially spaced, annular undercuts 354, 356 for reception of rings 302, in the same manner as earlier described with respect to FIGS. 12-14. The rings 302 are compressed in pockets 358, 360 defined by undercuts 354, 356 respectively, as shown for the rings 302 in FIGS. 13 and 14, and are free to float axially within the confines of the pockets 358, 360.

The friction generating structure in FIGS. 12-16 can be used in conjunction with that in FIG. 17 to enhance the vibration damping capabilities of a system.

The vibration damping capability for the systems employing the rings 302 is dictated by the material from which the rings are made and also by the diameter of the ring 302 which determines the frictional force moment arm.

Further, the frictional vibration damping capability is affected by the axial location of the rings 302 relative to the roller bearing 350, which acts as a fulcrum. A greater braking torque/damping capability is realized by placing the rings 302, and structure cooperating therewith, closer to the bearing 350. This difference is a result of the different moment arms for the radial force on the rings 302. A longer moment arm resulting from placement of the rings 302 further axially away from the bearing 350 more positively resists tilting of the tensioner arm 342.

A modified form of belt tensioning apparatus is shown in FIGS. 18 and 19 at 362. The belt tensioning apparatus 362 is identical to that 274 in FIG. 12 with the exception of the frictional force developing structure at 364. Elements corresponding between FIGS. 12 and 18 are numbered the same in the drawings.

The flange 308 has an undercut 366 axially coinciding with an undercut 368 on the flange 306 on the support plate 278. When viewed in cross section, a rectangular pocket 370 is defined between the flanges 306, 308 for reception of a frictional force developing ring 372, which has a matching, cross sectional configuration to be held closely within the pocket 370.

The ring 372 has a cut 374 therethrough defining spaced ends 376, 378. The ring 272 is preferably made from a molded nylon or Teflon ® material and does not need to be bonded to either of the flanges 306, 308. Consequently, thermal expansion of the flanges 306, 308 will not cause cracking of the ring 372, as it might potentially do were the ring 372 adhered to one of the flanges 306, 308. Because of the large frictional contact area, a material with a relatively low coefficient of friction can be employed to produce the requisite damping force. The low coefficient of friction material is preferred from the standpoint that it does not significantly inhibit tensioner arm rotation so that the tensioner arm will pivot smoothly.

The invention, however, contemplates that the friction ring 372 could be made from a medium friction material such as copper alloy, oil impregnated sintered metal, or aluminum, or a material having a high friction coefficient such as rubber or asbestos.

While the ring 372 need not be fixed to the elements between which it resides, if the thermal coefficient for those elements is the same as that for the ring 372, the ring 372 is preferably made without the interruption 374 and fixed with respect to one of these elements.

In a preferred form, the width W of the friction ring 372 is on the order of one tenth to one third of the axial dimensions of the tensioning apparatus 362. A preferred ring thickness is 2-5 mm.

To increase the friction between the ring 372 and flanges 306, 308, a set screw 380 is threadably received in a bore 382 which extends fully through that portion 384 of the flange 308 that axially overlaps the ring 372. The set screw 380 can be threaded into the bore 382 to increase radial pressure on the ring 372 and, as a result, the damping capability for the system. While one set screw 380 is disclosed, any number of set screws can be employed.

It is also contemplated that the pocket 370 could be elongated in an axial direction to allow selected axial movement of the ring 372 to thereby vary the frictional force moment arm to change damping characteristics for the system.

The foregoing disclosure of specific embodiments is intended to be illustrative of the broad concepts comprehended by the invention.

We claim:

1. An apparatus for tensioning a drive belt, said tensioning apparatus comprising:
   a tensioner arm;
   means on the tensioner arm for engaging a surface of a drive belt;
   means for mounting the tensioner arm to a support for pivoting movement about a first axis in first and second opposite directions relative to the support,
   said belt engaging means tracing a path as it pivots in said first and second directions,
   said tensioner arm mounting means including roller bearing means for guiding relative movement between the tensioner arm and support,
   said tensioner arm having a surface facing axially oppositely of the support relative to said first axis,
   at least a part of said roller bearing means being adjacent to said axially oppositely facing surface of the tensioner arm,
   the at least part of the roller bearing means being entirely spaced in an axial direction with respect to the first axis from the path of the belt engaging means; and
   means for normally biasing the belt in one of said first and second opposite directions relative to the support.

2. The apparatus for tensioning a drive belt according to claim 1 in combination with a support to which the tensioner arm is mounted for pivoting movement.

3. The apparatus for tensioning a drive belt according to claim 2 including means separate from said roller bearing means for developing a frictional force between said tensioner arm and support,
   said frictional force developing means including cooperating radially facing surfaces on the tensioner arm and support.

4. An apparatus for tensioning a drive belt, said tensioning apparatus comprising:
   a tensioner arm;
   means on the tensioner arm for engaging a surface of a drive belt;
   means for mounting the tensioner arm to a support for pivoting movement about a first axis in first and second opposite directions relative to the support, said belt engaging means tracing a path as it pivots in said first and second directions, said tensioner arm mounting means including roller bearing means for guiding relative movement between the tensioner arm and support, said tensioner arm having a surface facing axially oppositely of the support relative to said first axis, at least a part of said roller bearing mans being adjacent to said axially oppositely facing surface of the tensioner arm, the at least part of the roller bearing means being entirely spaced in an axial direction with respect to the first axis from the path of the belt engaging means; and means for normally biasing the belt in one of said first and second opposite directions relative to the support; and means separate from said roller bearing means for developing a frictional force between said tensioner arm and support, wherein at least a portion of said belt engaging means extends axially beyond one axial end of the roller bearing means and at least a portion of the frictional force developing means extends axially beyond the other axial end of the roller bearing means.

5. The apparatus for tensioning a drive belt according to claim 3 wherein there is a radially facing friction generating surface on one of the tensioner arm and support and the frictional force developing means includes a deflectable tab that can be moved radially against the friction generating surface on the one of the tensioner arm and support.

6. The apparatus for tensioning a drive belt according to claim 3 including means for normally biasing the frictional force developing means against one of the tensioner arm and support.

7. The apparatus for tensioning a drive belt according to claim 3 wherein at least a portion of the frictional force developing means extends axially beyond one axial end of the roller bearing means and means are provided for normally biasing the portion of the frictional force developing means against one of the tensioner arm and support.

8. The apparatus for tensioning a drive belt according to claim 3 wherein the frictional force developing means is axially spaced entirely from one axial end of the roller bearing means.

9. The apparatus for tensioning a drive belt according to claim 3 wherein the frictional force developing means is spaced radially from the roller bearing means.

10. The apparatus for tensioning a drive belt according to claim 2 wherein the tensioner arm has a first radially facing surface and the frictional force developing means resides at least partially between the first radially facing surface and a radially oppositely facing surface on the support.

11. The apparatus for tensioning a drive belt according to claim 1 wherein the roller bearing means includes a plurality of axially spaced roller bearings.

12. An apparatus for tensioning a drive belt, said tensioning apparatus comprising:

a tensioner arm;

means on the tensioner arm for engaging a surface of a drive belt;

means for mounting the tensioner arm to a support for pivoting movement about a first axis in first and second opposite directions relative to the support, said belt engaging means tracing a path as it pivots in said first and second directions, said tensioner arm mounting means including roller bearing means for guiding relative movement between the tensioner arm and support, said tensioner arm having a surface facing axially oppositely of the support relative to said first axis, at least a part of said roller bearing means being adjacent to said axially oppositely facing surface of the tensioner arm, the at least part of the roller bearing means being entirely spaced in an axial direction with respect to the first axis from the path of the belt engaging means; and means for normally biasing the belt in one of said first and second opposite directions relative to the support, wherein said support has a shaft for supporting the tensioner arm, the tensioner arm has a base that surrounds the support shaft and is guided thereby in rotation in aid first and second opposite directions.

13. The apparatus for tensioning a drive belt according to claim 12 including means for simultaneously maintaining the tensioner arm on the support and the support against a fixed surface on which the tensioner arm and support are mounted.

14. The apparatus for tensioning a drive belt according to claim 13 wherein the first annular base part has an axial slit therein to allow deformation thereof.

15. The apparatus for tensioning a drive belt according to claim 12 wherein the tensioner arm base has a first annular part and a second annular part concentric with and radially outside of the first annular part and frictional force developing means are provided and cooperate between the base and the second tensioner arm base part.

16. The apparatus for tensioning a drive belt according to claim 15 wherein the frictional force developing means has at least a portion that projects axially beyond an axial end of the first tensioner arm base part.

17. The apparatus for tensioning a drive belt according to claim 15 wherein means are provided for normally biasing the frictional force developing means against one of the tensioner arm and support.

18. The apparatus for tensioning a drive belt according to claim 16 wherein the biasing means urges the portion of the frictional force developing means against one of the tensioner arm and support.

19. The apparatus for tensioning a drive belt according to claim 16 wherein the biasing means urges the first tensioner arm base part towards the support shaft to thereby squeeze the frictional force developing means between the first tensioner arm base part and support shaft.

20. The apparatus for tensioning a drive belt according to claim 19 wherein the frictional force developing means has an axial slot therein to define a radially deformable tab.

21. An apparatus for tensioning a drive belt, said tensioning apparatus comprising:

a tensioner arm defining a first pivot axis;

means on the tensioner arm for engaging a surface of a drive belt, said engaging means on the tensioner arm tracing a path as the tensioner arm pivots about the first axis;

means spaced axially with respect to the first axis from the path of the engaging means on the tensioner arm for guiding relative pivoting movement between the tensioner arm and a support therefor and having spaced axial ends, said path being spaced at least partially from one axial end of the guiding means; and means for developing a frictional force between said tensioner arm and support, said frictional force developing means including a radially facing surface on the tensioner arm, said radially facing surface having at least a portion spaced axially with respect to the first axis from the other axial end of the guide means.

22. The apparatus for tensioning a drive belt according to claim 21 in combination with a support for guiding pivoting movement of the tensioner arm, said support having a cup-shaped configuration opening in a first axial direction and an outer annular flange, the tensioner arm has a base with a cup shape opening in an axial direction opposite to said first direction and an outer annular flange, and means for connecting the tensioner arm base to the support so that the support flange and tensioner arm base flange are in axially overlapping relationship and the frictional force developing means resides radially between the axially overlapping flanges.

23. The apparatus for tensioning a drive belt according to claim 21 including a support for the tensioner arm and means for pivotably mounting the tensioner arm to the support, wherein the frictional force developing means comprises an annular member disposed between a part of each of said tensioner arm and support.

24. The apparatus for tensioning a drive belt according to claim 23 wherein means are provided for biasing the annular member against one of the tensioner arm and support.

25. The apparatus for tensioning a drive belt according to claim 23 wherein there is an axial slit in the annular member to allow deformation of the annular member.

26. The apparatus for tensioning a drive belt according to claim 23 wherein the annular member has a deflectable tab therein and the part of the base member has a deflectable tab in radial coincidence with the tab on the annular member and means are provided to bias the tabs in a radial direction.

27. The apparatus for tensioning a drive belt according to claim 23 wherein the portion of the frictional force developing means has a wall that has a non-uniform radial thickness.

28. The apparatus for tensioning a drive belt according to claim 23 including a support for the tensioner arm and means for pivotably mounting the tensioner arm on the support.

29. The apparatus for tensioning a drive belt according to claim 28 wherein the frictional force developing means resides radially outside of the guiding means.

30. The apparatus for tensioning a drive belt according to claim 28 wherein the tensioner arm and support cooperatively define a substantially enclosed receptacle for the annular member.

31. The apparatus for tensioning a drive belt according to claim 30 wherein the tensioner arm and support cooperatively define a plurality of substantially enclosed receptacles for reception of an annular member in each said receptacle.

32. The apparatus for tensioning a drive belt according to claim 28 wherein the annular member is not fixedly secured to either of the tensioner arm and support.

33. The apparatus for tensioning a drive belt according to claim 30 including means for urging the annular member radially against one of the tensioner arm and support.

34. An apparatus for tensioning a drive belt, said tensioning apparatus comprising:

a tensioner arm;

means on the tensioner arm for engaging a surface of a drive belt;

means for mounting the tensioner arm to a support for pivoting movement about a first axis in first and second opposite directions relative to the support, said tensioner arm mounting means including roller bearing means for guiding relative movement between the tensioner arm and support, said belt engaging means being at least partially spaced axially in a first direction relative to said first axis from said roller bearing means;

means separate from said roller bearing means for developing a frictional force between said tensioner arm and support, said frictional force developing means including a radially facing surface on the tensioner to engage a cooperating surface on the support, said radially facing tensioner arm surface being at least partially spaced axially in a second direction relative to said first axis from said roller bearing means.

* * * * *